July 23, 1963 R. L. KITTRELL 3,099,007
AIRCRAFT GUIDANCE CONTROL SIGNAL DEVELOPMENT SYSTEM
Filed Nov. 8, 1961 3 Sheets-Sheet 1
PRIOR ART INVENTOR.
RICHARD L. KITTRELL
BY
Moody & Anderson
AGENTS INVENTOR.
RICHARD L. KITTRELL
BY Maady & Anderson
AGENTS United States Patent Office 3,099,007
Patented July 23, 1963

3,099,007
AIRCRAFT GUIDANCE CONTROL SIGNAL
DEVELOPMENT SYSTEM
Richard L. Kittrell, Cedar Rapids, Iowa, assignor to Collins Radio Company, Cedar Rapids, Iowa, a corporation of Iowa
Filed Nov. 8, 1961, Ser. No. 151,095
11 Claims. (Cl. 343—107)

This invention relates generally to aircraft flight control systems and more particularly to an improved system of the type utilized to capture a radio-defined beam with a minimum of nuisance mode switching within the control system and with greater assurance of attaining selected ground track through novel utilization of heading and radio control.

This invention is an improvement on a type of system as described in Patent No. 3,041,607 to M. H. Rhodes et al., entitled, "Aircraft Guidance System," dated June 26, 1962, and assigned to the assignee of the present invention. In systems such as described in Patent No. 3,041,607 the autopilot develops from radio deviation signals and a signal proportional to the difference between the aircraft heading and a selected radio course (hereinafter termed "heading error signal") a composite bank command signal for subsequent control of aircraft surfaces so as to make good the selected course. In control signal development systems of this type, the command signal is reduced to zero when the aircraft is maneuvering in such a manner as to properly respond to the command inserted into the system by the pilot. As concerns lateral guidance signal development, the heading signal (rate of change of displacement) and the ratio deviation signal (displacement) are combined in algebraic fashion such that the heading signal provides damping, i.e., the heading signal is mixed in opposite sense to that of the ratio signal such that the resultant command is zero when the desired ground path is attained.

Inherent in this type of system, as concerns the development of horizontal guidance command signals, are means to effect crosswind compensation such that the aircraft is commanded to properly "crab" with respect to winds having a velocity component transverse to the selected course such that the desired ground track may be attained. Patent No. 3,041,607 describes a means of attaining crosswind compensation by performing an operation upon the heading error signal such that the steady state component thereof is cancelled or "washed out" so as to remove the component which would otherwise tend to command the aircraft to bank to maintain the selected heading at the expense of being blown off the desired ground path.

Also defined in Patent No. 3,041,607 are means whereby the guidance circuitry functions automatically to develop distinct command signals in response to "on-course" conditions as compared to "off-course" conditions. Of particular importance in this respect is the desirability of introducing crosswind compensation only if the command signals are sufficiently small so as to define an aircraft position very nearly on the commanded course. For this reason systems such as the above referenced system include means to introduce crosswind correction only when "on course"; the "on-course" condition being defined as a predetermined displacement (angular error with respect to the selected radio course) and additionally a predetermined small discrepancy between the aircraft's actual heading and that defined by the selected course. These prior systems also advantageously include means for excluding the radio signal from the formulation of the composite command signal when an "off-course" condition is sensed in the interests of attaining the smoothest possible maneuver.

In the presence of crosswinds and during the reception of noisy radio beams characteristic with passage over the cone of confusion associated with an omni-range station, the threshold sensing arrangements in this type of guidance circuitry may at times work to the disadvantage of attaining a smooth maneuver. In other words, under conditions such as being blown off course and during times when radio varies erratically, these systems may increase the reliability of attaining the desired ground track at the expense of commanding a somewhat uncomfortable maneuver as concerns the passenger. At other times an undesirable bracketing may be realized before the desired ground track is attained and held.

It is an object, therefore, of the present invention to provide an improved beam capture arrangement for an autopilot of the type which excludes radio under certain conditions of unreliability and which effects crosswind compensation only when such compensation is desirable and not under conditions (to be further discussed) wherein crosswind compensation prematurely introduced may be detrimental to attainment of the smoothest and shortest approach to a desired course.

It is a further object of the present invention to provide a command signal development system for an autopilot incorporating a change of maneuver limits correlated to on-course and off-course conditions by which the optimum maneuver limit may be experienced under all conditions without introducing nuisance switching between on- and off-course operating modes.

The invention is featured in the provision of novel logic controlled timing means by which a "capture" phase of operation allows wide maneuver limits, sets gains suitable for rapid acquisition of the beam and eliminates automatic crosswind correction together with a time-delayed "true-on-course" phase once an on-course condition is sensed by which maneuver limits are narrowed, gains are adjusted for best stability and automatic crosswind correction is inserted.

These and other features and objects of the present invention will become apparent on reading the following description in conjunction with the accompanying drawings in which.

The present invention forms a part of autopilot systems which incorporate in their horizontal guidance signal development the provision for excluding radio when the radio signal exceeds a predetermined magnitude or varies erratically. As above-referenced, a system of this type is disclosed in Patent No. 3,041,607. The circuitry to be discussed receives a radio signal taken from a visual omnirange (VOR) station which radiates an infinite number of radio beams in all directions. The pilot may select any one of these beams by the selection of a given course and follow it toward the ground station or away from the ground station as desired. As long as the aircraft is on the selected course, the radio deviation signal is zero and deviations from the desired course result in radio deviation signals with polarity and magnitude indicative of the direction and extent respectively of the aircraft's displacement with respect to the selected course.

Figure 1:
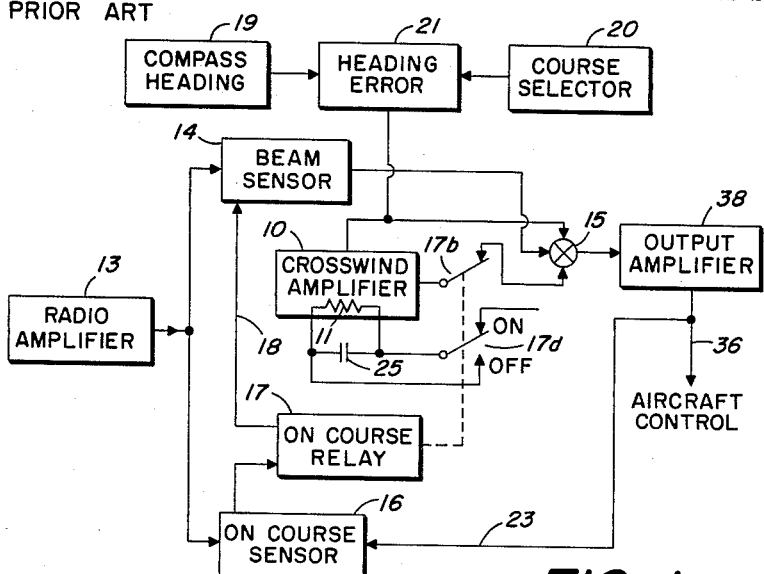
FIGURE 1 is a functional diagram of a known horizontal guidance signal development system prior to the incorporation of the present invention.

Conventional horizontal guidance autopilot systems combine radio deviation signal with a heading error signal to arrive at a composite bank command signal for aircraft control. It has been found desirable to selectively exclude the radio signal under conditions when it is excessively large or varies erratically. Such a system is defined in the above-referenced patent and is illustrated functionally in FIGURE 1. With reference to FIGURE 1, an output amplifier 38 provides a composite output signal 36 for horizontal aircraft control. Amplifier 38 receives a composite signal from a mixer 15. Inputs to mixer 15 are radio deviation and heading error which, in a well-known manner, are indicative of the degree of course deviation and the rate-of-change of this deviation, respectively. Heading from compass 19 is compared with a selected radio course from course selector 20 in a heading error development circuit 21 such that the output therefrom is indicative of any discrepancy between the compass heading and the selected course. A course deviation signal from radio amplifier 13 is applied through a beam sensor 14 to the mixer 15. Beam sensor 14, as will be further described, prevents the radio signal from reaching mixer 15 should the radio signal exceed a predetermined value or vary erratically. The radio signal from amplifier 13 is additionally connected to an on-course sensor 16. On-course sensor 16 additionally receives the output command signal 23. On-course sensor 16, as will be further described, operates an on-course relay 17 only when the radio signal is less than a predetermined value such as to define an "on-course" condition or the bank command signal is sufficiently low. On-course relay 17 effects an interconnection 18 with beam sensor 14 such that beam sensor 14 is rendered ineffective in blocking the radio signal during off-course conditions.

The system of FIGURE 1 additionally includes means for effecting crosswind compensation by cancellation or washing out of the steady state component of the heading error signal. For this purpose, and, as described in the above-referenced patent, the heading error signal, in addition to being directly applied to mixer 15, is applied through a crosswind amplifier 10 and the output of amplifier 10 applied to mixer 15 only under on-course conditions as sensed by the on-course sensor 16. Crosswind compensation is realized by the integration of the heading error signal within amplifier 10 by means of a capacitor 25 shunting the gain resistor 11 of the amplifier which might be, for example, a magnetic amplifier. The crosswind amplifier 10 integrates the heading error signal to develop the steady state component thereof and inverts the signal such that, when combined with the direct application of the heading error signal to mixer 15, it effects a cancellation of the steady state component and allows the aircraft to crab into crosswind so as to make good a selected ground track. Since the integrating feature involves a capacitor charging to the steady state component of the heading error signal, it is desirable that this integrating operation be initiated only during on-course conditions. For this reason the crosswind amplifier is disconnected from mixer 15 by relay contacts 17b during off-course conditions and the integrating capacitor 25 is shorted through contacts 17d to erase its "memory."

It is to be realized that the terms "on-course" and "off-course" define flight situations for which different parameters set into the control circuitry whereby various desirable limits and mixing techniques peculiar to each of these situations may be selectively inserted to enable rapid acquisition of selected ground track when far off the track and to enable a reduced reaction within a defined sector centered about the desired course in the interests of rapid acquisition and smooth maintenance of the desired flight path.

The arrangement of FIGURE 1 is effective in controlling horizontal aircraft guidance. However, the inclusion of the beam sensing and on-course sensing functions with respect to the radio signal, and the selective control of crosswind compensation as a function of on- and off-course conditions, may create difficulties under certain flight situations.

Figure 2:
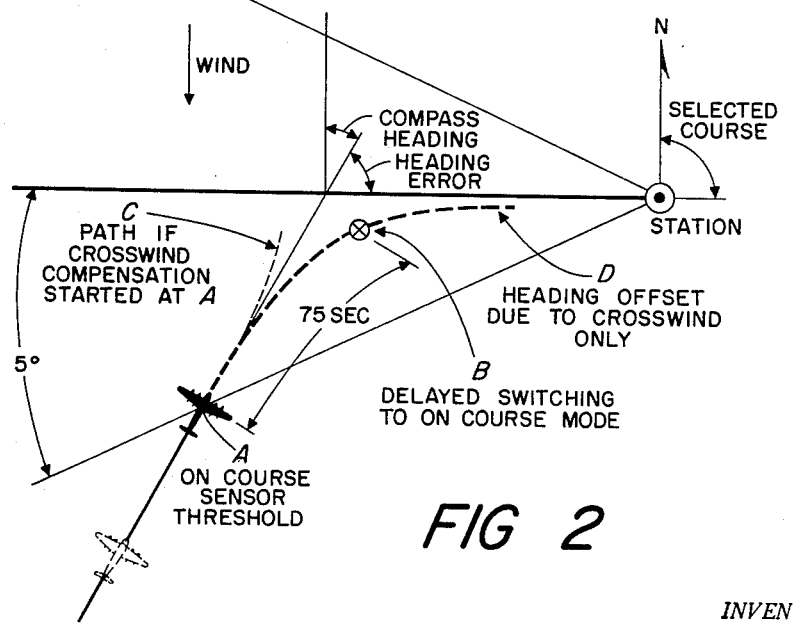
FIGURE 2 is a diagrammatic illustration of a beam capture situation depicting certain operational aspects of the present invention.

Considering, for example, the diagrammatic flight situation depicted in FIGURE 2, an aircraft at point A is seen approaching a course 90° to a station from the down-wind side. An angular sector of 5° on each side of the selected course might indicate the predefined on-course area within which the transverse deviation from the radio defined selected course is beneath a predetermined magnitude. Since radio deviation signals from an omni-range receiver are angular error signals, FIGURE 2 illustrates the boundary between on-course and off-course conditions as occurring at 5°, which 5° corresponds to a predetermined radio deviation signal magnitude. As the aircraft reaches point A, the prior circuitry of FIGURE 1 would function to position the on-course relay 17 in the on-course condition at which time crosswind compensation would be effected. Now, considering a strong crosswind as illustrated, the closing velocity between the aircraft and the selected radio course may be reduced to a low value. If, as in previous systems, the predetermined radio deviation defined by the 5° sector line were the only requirement for switching to the on-course phase, the crosswind correction might be initiated prematurely when the approach to the selected course includes a considerable heading error as illustrated. As previously discussed, the crosswind correction is accomplished by an integrating operation in the crosswind amplifier 10 whereby the capacitor 25 charges to the heading error magnitude. With the aircraft taking a fairly sharp cut at the selected course as illustrated in FIGURE 2, part of this heading error is due to crosswind and part of it is due to closing velocity between the aircraft and the selected course. In other words, the crosswind compensation which operates on an integrating principle, has no way of attributing the heading error to either crosswind or the closing velocity and, in effect, operates as though the entire heading error is due to crosswind. Now, an asymptotic approach to the selected course, as defined by the heavily dashed line in FIGURE 2, is desired. If crosswind compensation is prematurely induced, the subsequent mixing of heading and radio deviation in mixer 15 may result in an output bank command signal of a polarity so as to command an even sharper cut at the selected course, as defined by the light dashed line C in FIGURE 2. This situation would eventually enable the aircraft to capture the desired radio beam, but would obviously bring on excessive bracketing. To effect the desired asymptotic approach it would be desirable to delay the crosswind compensation once the on-course threshold is sensed at A until such a time as the aircraft heading is more nearly that of the selected course. Further, in the presence of an extremely high velocity crosswind, the aircraft may hover for a considerable time about the on-course threshold so as to cause the on-course sensor to fluctuate in an undesirable fashion between the on- and off-course operation conditions.

Although not specifically illustrated in FIGURE 1, the above reference patent includes means for inserting different maneuver limits and system gains whereby lower maneuver limits are realized during on-course conditions in the interest of smooth acquisition in attainment of the radio defined course. Because of this, the presence of crosswind gusts at the threshold location A of the aircraft in FIGURE 2 could detrimentally prevent sufficient corrective action (due to low maneuver limits) to keep the gusts from blowing the aircraft beyond the threshold limit and subsequently cause autopilot mode switching back to the off-course phase. A further undesirable flight condition which may be encountered by the system, as depicted in FIGURE 1, is that of unnecessary nuisance maneuvering in response to alternate on- and off-course mode switching in the vicinity of the cone of confusion of a station. The erratic radio signals in such areas cause the on-course sensor 16 to alternately sense on- and off-course conditions and thereby undesirably introduce changing bank commands which would rock the aircraft unnecessarily.

The present invention is an improved means for establishing optimum maneuver limits in the presence of crosswind whereby undesirable nuisance switching enumerated is eliminated. The present invention operates on the principle of "track" (on-course) and "capture" (true off-course) phases. On-course threshold is sensed as in the previously referenced system, but means are incorporated to delay the instigation of crosswind compensation and gain switching until a predetermined time after the on-course threshold is sensed. Then, once on course, the present invention provides means whereby the circuitry switches back to the off-course or capture phase only after a time delay after sensing off-course threshold. In the latter situation, sensing off-course is a function of sufficiently large radio signals and not bank commands to thereby allow the use of the full maneuver limit to keep on course without tripping the off-course sensor.

The improved maneuver in accordance with the present invention is illustrated in FIGURE 2 wherein the aircraft at point A is at the on-course threshold and a delay (for example, 75 seconds) is introduced to enable the aircraft to approach a point B before the on-course mode switching is actually accomplished and cross-wind compensation is instigated. This enables the aircraft to utilize the higher gains and command limits between points A and B in the presence of crosswind to effect the asymptotic approach. Beyond point B any heading offset would be due to crosswind only, not to the fact that a considerable cut is being taken at the selected radio course. The manner in which this desirable condition is realized will become more apparent upon a consideration of the improved system as illustrated in FIGURE 3.

Figure 3:
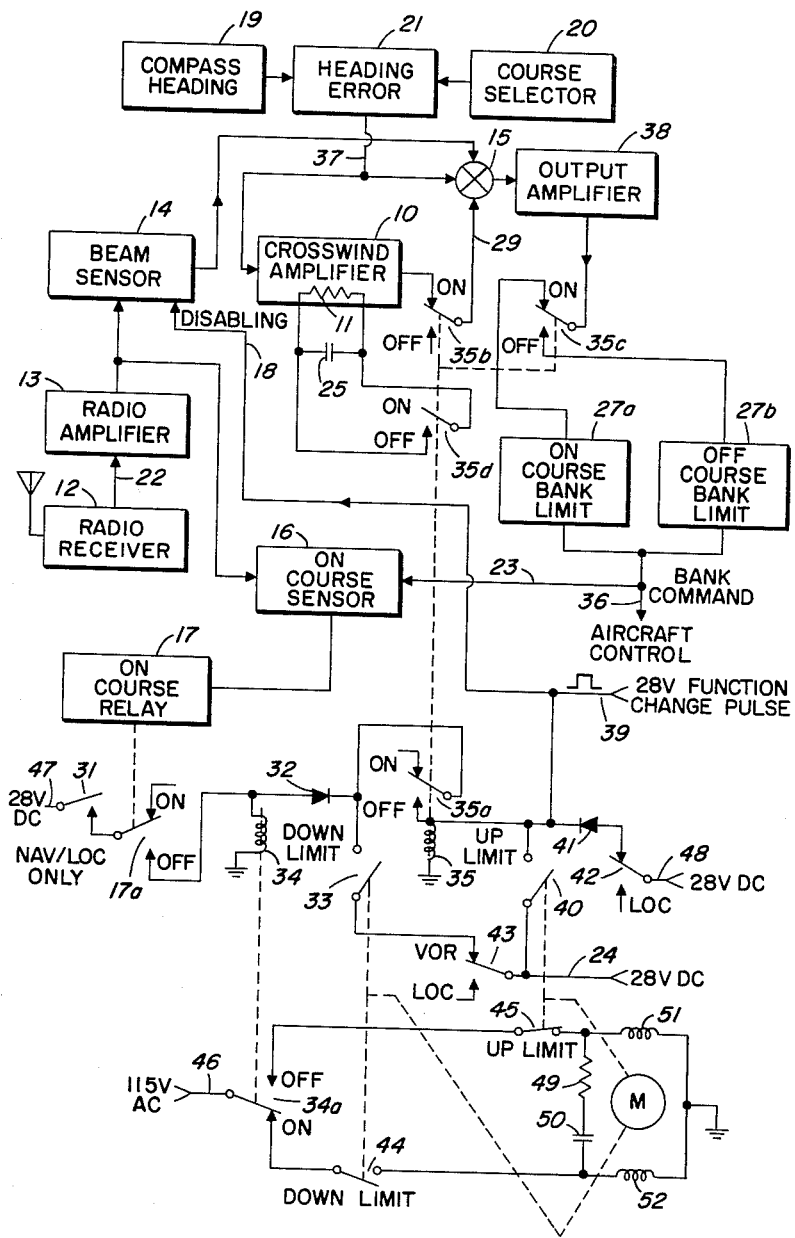
FIGURE 3 is a functional diagram of the improved command signal development arrangement in accordance with the present invention.

FIGURE 3 shows functionally the incorporation of the present invention in conjunction with the previously discussed prior system of FIGURE 1. Corresponding reference numerals are utilized to identify common portions of the circuitry.

For illustrative purposes the invention will be described as incorporated with the development of a bank command signal in the horizontal control circuitry of an autopilot system, such as that described, for example, in the previously referenced co-pending application. It is to be understood, however, that the invention, though described as it may be used in capture of variable omni-range radio beams, could be applied as well to the capture of a glide slope beam or a localizer beam.

With reference to FIGURE 3, a heading error development circuitry 21 receives inputs from compass heading 19 and course selector 20 to develop an output proportional to the difference between the aircraft's magnetic heading and a selected omni-range course, respectively. The heading error output 37 is applied directly to a mixer 15 and additionally through crosswind amplifier 10 and relay contracts 35b as a second input 29 to mixer 15. The latter mixer input, as previously described, corresponds to the inverted steady state component of the heading error signal. This latter signal, when combined with the heading error signal 37 effects crosswind compensation when relay contact 35b is in the illustrated "on" position. The significance of this switching arrangement will be further discussed.

A radio receiver 12 which, in this example, would be an omni-range receiver, develops an output signal 22 which, in a well-known manner, provides a direct current signal with amplitude and polarity proportional to the extent and direction of departure of the aircraft from a radio-defined course as set into the system by course selector 20. This radio deviation signal is amplified in amplifier 13 and applied through a beam sensor 14 as a third input to mixer 15. Beam sensor 14 functions to pass the radio signal when its magnitude and rate of change of magnitude do not exceed predetermined thresholds. Alternately, the functioning of beam sensor 14 might be described as cutting out radio from mixer 15 should the radio signal be excessive, or be varying erratically. The manner in which this monitoring is accomplished will be further discussed.

Mixer 15 develops a composite signal which is amplified in output amplifier 38 and applied through relay contacts 35c and one of the other of bank limiters 27a and 27b as the output bank command signal 36 for application to further aircraft control circuitry which is not the subject of the present invention. Relay contacts 35b and 35c are illustrated in an "on" position such that a composite output signal 36 is formulated from radio deviation and heading error with the steady state component of the heading error signal washed out. The output from amplifier 38 is limited by an on-course bank limit 27a which limits the bank command signal to a magnitude less than the off-course bank limit 27b so as to command a narrower maneuver. Further relay contacts 35d, in the "on" position, as illustrated, remove a short which is placed across the integrating capacitor 25 associated with the feedback resistor in crosswind amplifier 10, the shorting action occurring in the "off" position of relay contact 35d.

The output from radio amplifier 13 is further applied to an on-course sensor 16, which, as previously discussed with reference to FIGURE 1, functions to activate an on-course relay 17 when the radio deviation signal from amplifier 13 fails beneath a predetermined amplitude threshold and/or a predetermined rate of change of amplitude threshold.

It is to be noted that in the system of FIGURE 1 crosswind compensation is introduced as a direct function of the operation of the on-course sensing relay and cross-wind compensation is thereby introduced or taken out of the system in direct response to the threshold being sensed by on-course sensor 16. By comparison, a significant difference in the present invention is the provision of a further relay 35, the contacts of which perform the function previously performed directly by the on-course relay 17.

In the present invention, the activation of on-course relay 17, in response to sensor 16 determining an on-course threshold, does not directly introduce mode switching. Mode switching is introduced in a delayed fashion through the incorporation of the timing and logic switching circuitry. The timing and logic circuitry centers about the operation of a timing motor. The motor is a split phase reversible type including field windings 51 and 52 with first ends thereof connected to common ground and second ends thereof connected through rotational limit switches 45 and 44, respectively, to relay contacts 34a, through which a 115 volt A.C. energizing source 46 is selectively applied. A resistor 49 and phase shifting capacitor 50 are connected directly across the ungrounded ends of motor windings 51 and 52. The motor energizing source 46 is applied directly through one of the motor windings to ground and through the other motor winding and the phase shifting capacitor to ground so as to effect motor rotation in one direction or the other in response to the positioning of relay contacts 34a.

Relay contacts 34a are positioned in accordance with the activation state of relay winding 34 which is energized by the on-course relay contacts 17a when the latter contacts are positioned in the off position. The off-course position of contacts 17a corresponds to de-energization of the on-course relay 17 by on-course sensor 16. A 28-volt D.C. energizing source for relay source 34 is connected through a switch 31 which is closed when the autopilot system is switched to the NAV/LOC function. Assumption is made, of course, for purposes of explanation, that switch 31 is closed. Thus, the relative direction of rotation of the timing motor is seen to be a function of the "on" or "off" course conditions sensed by on-course sensor 16 which effect corresponding deactivation or activation of relay 34.

As previously mentioned, the actual system function switching as concerns the signal mixing and the introduction of the various bank limits is accomplished by the operation of a further relay 35 which includes a set of contacts 35a, the movable contact of which is connected through a diode 32 to the "off" side of on-course relay contacts 17a. The winding of relay 35 is seen to be connectible through this latter defined path when relay 35 is energized. The winding of relay 35 is additionally connected to a source of "function change" pulses 39; is connected through a diode 41 and contacts of a switch 42 to a further source 48 of 28 volts D.C.; is connected through an up-limit switch 40 to a still further source 24 of 28 volts D.C. with the latter 28 volt D.C. source being connectible to the relay winding through a switch 43 and a down-limit switch 33 and relay contact 35a when closed. The significance of these multiple energizing paths, some momentary, some selectively completed by switching, forms the novel logic and timing arrangement to provide the desirable delay in system function switching in accordance with the present invention and may best be explained by the following operational description relating to specific flight situations.

To comprehend the operation of the logic circuitry, certain system switching and the operational characteristics of the motor-limit switches should be summarized as follows:

(1) The 28 volt function change pulse is generated by circuitry not illustrated when the autopilot system, of which FIGURE 3 forms a part, is switched to the NAV/LOC mode wherein radio deviation is to be included in the formulation of the bank command signal.

(2) The source 48 of 28 volts D.C. is applied to relay 35 through rectifier 41 in the illustrated position of switch 42 for a predetermined time (for example, six seconds) after the radio receiver 12 is tuned to a localizer frequency.

(3) The VOR/LOC switch 43 is positioned in accordance with the radio receiver being tuned to a VOR frequency, as illustrated, or to a localizer frequency.

(4) The 28 volt energizing source 47 is connected through the NAV/LOC switch 31 only when the system is placed in the NAV/LOC function.

(5) Limit switch 33 is mechanically connected to the shaft of the timing motor such that it is open only when the motor is in the extreme down limit corresponding to a first rotational limit of the timing motor.

(6) Limit switch 40 is mechanically connected to the timing motor shaft such that it is closed only when the up limit of motor rotation is effected corresponding to a second, opposite, rotational limit of the timing motor.

(7) Motor limit switch 44 is mechanically connected to the timing motor shaft so as to be opened at, and thus define, the down limit of motor rotation.

(8) Limit switch 45 is mechanically connected to the motor shaft so as to open at, and thus define, the up limit of motor rotation.

The significance of the timing motor and its tie-in with the associated switching arrangements may now be defined by consideration of specific flight situations.

Initial Capture From Off Course

FIGURE 2 may be used as general reference for this flight situation. Consider the aircraft as being in the area defined by the phantom configuration which lies outside the sector defining an on-course condition as concerns the on-course sensor 16. For purpose of explanation, let it be assumed that the autopilot of which the circuitry of FIGURE 3 is a part was previously switched to some function other than NAV/LOC and therefore the switch 31 in FIGURE 3 would be open. With switch 31 open, relay 34 is unenergized, as illustrated, and the timing motor would accordingly have run to its extreme down limit, as ilustrated, with the down-limit switch 44 open. Since the up-limit switch 45 is closed, the timing motor is readied for rotation in the up direction upon energization of relay 34.

Upon switching to the NAV/LOC function an initial sequence of switching is effected. Firstly, on-course sensor 16 senses an off-course condition and on-course relay 17 is deactivated. Switch 31 is closed by the selection of the NAV/LOC function to apply the 28-volt source 47 through relay contact 17a to the winding of relay 34. At the same instant the selection of the NAV/LOC function generates the 28-volt function change pulse 39 which is applied to the winding of relay 35 to activate relay 35. Relay 35 is locked in the activated position through contacts 35a due to the completion therethrough of the 28-volt D.C. source 47 through switch 31, relay contacts 17a and diode 32. With relay contact 17a in the "off" position, relay 34 is energized to position contacts 34a to the "off" position and thus the motor starts running "up."

As the timer motor leaves the down-limit position, down-limit switch 33 closes to complete a further locking path for the winding of relay 35 through the holding contacts 35a and switch 43 (assuming a VOR frequency is being tuned) to the 28-volt D.C. source 24. The timer motor continues running "up" to its predetermined up-limit position at which time up-limit switch 45 opens to stop rotation of the motor. As the motor reaches its up-limit position the up-limit switch 40 closes to complete a third locking path for the winding of relay 35 through switch 40 to the 28-volt D.C. source 24. Thus far the arrangement has activated relay 35 to the "off" position and provided locking paths for the activation thereof as a function of motor position.

Now, with reference to FIGURE 2, as the aircraft reaches the on-course sensor threshold position at point A, on-course sensor 16 detects the on-course threshold and energizes the on-course relay 17, to position relay contacts 17a to the "on" position. As contacts 17a break the path between relay 34 and energizing source 47, relay 34 is deactivated such that contacts 34a are switched to the "on" position and the timer motor begins rotation towards the down limit.

Simultaneously with the opening of relay contacts 17a as concerns the energizing source 47, the locking path for relay 35 through diode 32 is opened. As the timer motor leaves the up-limit position, the up-limit switch 40 opens to remove the second locking path for relay 35. However, the down-limit switch 33 remains closed to maintain its locking path for relay 35 and thus no function switching is yet accomplished by relay 35. After a predetermined time, for example, 75 seconds, the timer motor rotates from the up-limit to the down-limit position (assuming on-course relay 17 remains in an on-course position). As the timer reaches the down-limit position, limit switch 44 opens to stop the motor rotation and limit switch 33 opens to remove the one remaining locking path for relay 35. Relay 35 is deactivated to place its contacts 35a, 35b and 35d in the "on" position. This "on" position is the switching operation which actually instigates crosswind compensation and selects the narrower on-course bank limit.

It is seen that the system switching to on course is accomplished a predetermined time (75 seconds) after the on-course sensor first senses an on-course condition. This delay is illustrated graphically in FIGURE 2 and assures that the aircraft may continue without crosswind compensation towards a point B wherein the heading off-set is more assuredly that due to crosswind only and not due to closing velocity, as previously discussed. In effect a 75-second "settling" time is automatically inserted in the switching system to make sure that the aircraft situation with respect to the selected course has settled to an on course condition.

*Aircraft on Course—Being Blown Off Course*

Once the above described mode switching is realized with the deactivation of the relay 35, crosswind compensation is instigated to maintain the aircraft on course in spite of crosswind. Since the crosswind compensation is accomplished by an integration process as concerns the heading error signal, it takes a predetermined time for the crosswind amplifier to build up the necessary correction in heading and there is a possibility that the aircraft may be flying in the vicinity of the on-course-off-course threshold point for several seconds, particularly if, as illustrated in FIGURE 2, the aircraft is attempting a beam capture into a crosswind. At this point gusts of crosswind could push the aircraft back over the on-course threshold limit and again instigate nuisance switching from off to on course. Two features of the present invention prevent this situation, as follows:

(1) The timer motor must have had to run all the way down to the down limit in order to deactivate relay 35 and accomplish the on-course mode switching.

Thus, if off course is sensed by sensor 16 after first sensing on course, the timer, through the action of on-course relay contacts 17a and relay contacts 34a, would start rotation toward the up limit, but not until 75 seconds later does limit switch 40 close and relay 35 become activated to actually switch in the true off-course mode. Thus, there is an additional 75 seconds for the crosswind correction to operate to correct for the error in position caused by the crosswind gusts.

(2) While the on-course sensor 16 required both radio deviation and bank command to be low to sense the on-course condition, the bank command feed to on-course sensor 16 during the on-course condition, as determined by relay 35, is limited by the on-course bank limit 27a, which is adjusted to be less than the operational threshold of sensor 16, as concerns bank command. Thus, only excessive radio error from radio amplifier 13 as applied to on-course sensor 16 can trip the on-course relay 17 to off-course.

(3) *Over the cone operation, enter on course.*—A cone of confusion exists over VOR ground radio stations as concerns the transmission pattern. Within this cone both the radio signal and the rate of change of radio signal become excessively high. For this reason, it is known, as illustrated in the prior system of FIGURE 1, to employ means such as the beam sensor 14 to cut radio out of the formulation of the composite bank command signal such that the aircraft is guided in response to a composite signal comprised of heading modified by crosswind correction. It has been found that as an aircraft passes through a cone of confusion there is an initial high amplitude received signal followed by a comparatively "quiet" period prior to the center of the cone with the subsequent encounter of a second "noisy" period followed by a second "quiet" period. When the initial high amplitude radio signal is encountered, the on-course sensor senses off-course and starts the timer motor running toward the upper limit due to the energization of relay 34. At each of the "quiet" periods the on-course sensor 16 senses on-course and the timer is caused to run part way back towards the down limit. In effect, the present invention operates, during the passage of an aircraft through such a cone of confusion, to provide a mode switching delay in excess of the predetermined 75-second period so as to prevent nuisance switching between on and off course as the aircraft passes through the cone. It is to be realized that the switching from on to off course with the variation in bank limits accompanying these conditions would cause an aircraft to rock uncomfortably. The present invention operates to delay the switching to on-course condition by a period in excess of 75 seconds, which in effect allows the aircraft to pass through a cone without experiencing nuisance switching. Should the aircraft come out of such a cone in an off-course situation, the actual time of switching back to the on-course mode, as defined by deactivation of relay 35, is delayed sufficiently that the region of extremely high gain which is associated with regions near a station has been passed.

The timing and logic circuitry of the present invention is thus seen to provide a novel and important time delay in the instigation of mode switching within the circuitry as concerned with the sensing of on-course and off-course conditions. The circuitry provides automatic switching from one set of conditions to a different set of conditions without undesirable alternations between sets during automatic pilot operation on an aircraft. The two conditions may be summarized as follows: A "capture" or off-course phase allows wide maneuver limits, sets higher gains for rapid acquisition for the desired radio course and eliminates crosswind correction; "on-course" or track phase narrows the maneuver limits and starts automatic crosswind correction. The basic utilization of on-course and off-course operating modes in such command signal development circuitry is in the interest of smoothing "capturing" a selected radio course in a minimum of time. The present invention is an improvement over this basic concept in inserting a time delay means between threshold sensing and actual mode switching by which the smooth acquisition and maintenance of a radio-defined course is more readily attained and is attained in a less complex manner than in prior systems.

Figure 4:
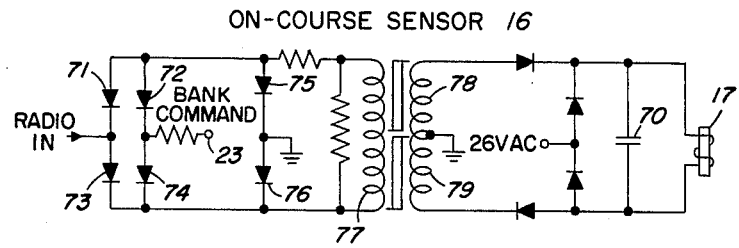
FIGURE 4 is a schematic diagram of a preferred type of on-course sensor which may be used in the systems of FIGURE 1 and 3; and, FIGURE 5 is a schematic diagram of a preferred type of beam sensor which may be used in the systems of FIGURES 1 and 3.
Figure 5:
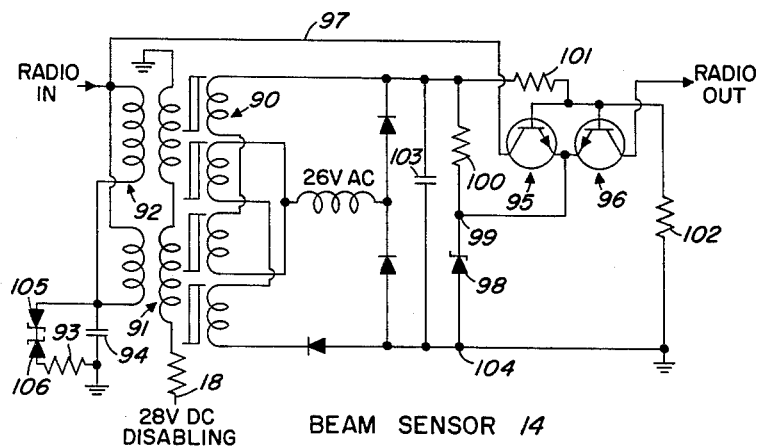

The beam sensor 14 and on-course sensor 16 have been discussed with respect to their generalized functioning in response to certain input signals. FIGURES 4 and 5 schematically illustrate embodiments incorporating magnetic amplifier principles which may, in a preferred embodiment, be incorporated to provide the previously discussed functions of these signal translating devices.

With reference to FIGURE 4, on-course sensor 16 might be comprised of a magnetic amplifier application wherein a control winding 77 is wound common to a pair of core members and first and second power windings 78 and 79 are wound individually on each of the core members. In the absence of a D.C. signal being applied to the control winding 77, the power windings 78 and 79, in conjunction with an alternating-current power source and necessary diode arrangement, produce an output across capacitor 70 of sufficient magnitude to energize the on-course relay 17. Signal development for the control winding 77 is obtained through a diode network comprised of diodes 71–76. The radio deviation signal is applied to the junction between diodes 71 and 73, while the bank command signal from connector 23 is applied to the junction between diodes 72 and 74. A return path to ground for both the radio signal and the bank command signal is provided between the remaining diodes 75 and 76. The bridge-like arrangement of diodes functions to develop a unidirectional signal path through control windings 77 in the presence of radio or bank command signals of either polarity. Thus a D.C. signal is applied through control winding 77 with magnitude proportional to the magnitude of the input radio or bank command signals, but always of a polarity so as to reduce the output across output capacitor 70 in the power loop. In the absence of radio or bank command signal, the on-course sensor develops an output voltage across condenser 70 sufficient to keep the on-course relay energized. When the radio signal exceeds a predetermined value or the bank command signal exceeds a predetermined magnitude, control winding 77 produces a degenerative effect upon the output voltage across capacitor 70 such that on-course relay 17 is de-energized for input signals exceeding these predetermined magnitudes. By judicious choice of circuit parameters, the output characteristic, that is, the voltage across output capacitor 70, may be caused to drop sharply from a voltage sufficient to keep relay 17 energized to a voltage which falls far beneath the threshold of the relay. It should be noted that, although the on-course sensor has been illustrated as a magnetic amplifier application in FIGURE 4, other signal translating devices responsive to given input signal threshold may be incorporated in the present invention. For the purpose of the present invention, the on-course sensor must respond to de-energize the on-course relay 17 to indicate an off-course threshold when the input to the circuit exceeds a predetermined value. Thus, a transistorized switching circuit, such as described in previously-referenced Patent No. 3,041,607, might equally serve to provide the desired functioning.

A type of beam modifier 14 which may be preferably incorporated in the present invention is shown in FIGURE 5. As previously discussed, the beam modifier 14 of the present invention includes a normally closed electronic switching means through which the radio signal is serially connected to mixer 15. The electronic switch is normally closed to allow the passage of radio and means must be incorporated such that a radio signal exceeding a predetermined value or one which is varying erratically will effect an opening of the electronic switch so as to prevent the passing of radio signal to mixer 15. Beam modifier 14 must additionally be disabled by the presence of the 28-volt disabling voltage from connector 18. In the presence of the disabling voltage, the normally closed electronic switch of the beam modifier cannot be opened even though the radio signal input is excessive or is varying erratically.

The preferred beam modifier circuitry of FIGURE 5 is basically that disclosed and claimed in Patent No. 3,038,089, dated June 5, 1962, entitled, "Electronic Switch," assigned by Kittrell et al. to the assignee of the present invention. The circuit comprises a full-wave magnetic amplifier arrangement with power windings 90 connected in series and control windings 92 connected in parallel. This arrangement provides a fixed polarity output across capacitor 103 for inputs of either polarity. The magnetic amplifier output characteristic as seen across capacitor 103 is maximum in the absence of an input signal. Increasing the input signal through control windings 92 to a predetermined positive or negative value causes the magnetic amplifier output as seen across capacitor 103 to drop quite sharply to a comparatively low voltage. The voltage across capacitor 103 appears across two voltage dividing networks, the first consisting of resistor 100 and zener diode 98, and the second consisting of resistors 101 and 102. Thus junction point 99 will not rise above the zener voltage defined by diode 98 with respect to junction 104. However, the junction between resistors 101 and 102 can vary from a point exceeding the zener voltage to a point falling beneath the zener voltage depending upon the magnitude of the input signal to control windings 92. Transistors 95 and 96 have their bases tied to the junction between resistors 101 and 102 while their emitters are tied to junction point 99. Thus whenever the junction between resistors 101 and 102 falls beneath the zener voltage at junction point 99, transistors 95 and 96 are cut off. It is noted that the radio input signal through connector 97 is taken through the emitter-collector junctions of the two transistors to the output terminal. The two transistors 95 and 96 thus form an electronic switch serially inserted between the radio input terminal and the radio output terminal. The switch is selectively opened when the radio input exceeds a predetermined value. The circuit is made voltage rate sensitive by the addition of capacitor 94 shunted across the input resistor 93 in the control winding circuit. Zener diodes 105 and 106 may be included in series with input resistor 93 such that below the amplitude limit established by the diodes, the circuit is responsive only to rate and above the amplitude limit, the circuit is responsive only to amplitude.

As employed in the present invention, the above-discussed beam sensor is further provided with a second control winding 91 to which the 28-volt disabling line 18 is tied. In the presence of 28 volts D.C. on connector 18, the magnetic amplifier conducts excessively to ensure that the junction between resistors 101 and 102 is at a potential sufficiently above junction point 99 to render transistors 95 and 96 conductive regardless of the magnitude or rate variation of the radio signal applied to control windings 92. Thus in the presence of the disabling voltage on connector 18, control windings 92 are rendered ineffective in controlling the magnetic amplifier output voltage. The beam sensor is thus rendered ineffective in monitoring radio signals whenever the system of FIGURE 3 is functioning in the off-course mode as defined by relay 35 being energized.

Although the above-described beam sensor circuit has been illustrated in a preferred embodiment of the present invention, it is to be understood that other signal translating circuitry may perform the desired function. For the purpose of the present invention the beam modifier need only perform the function of selectively opening a switch to exclude radio from mixer 15 unless disabling voltage is present on connector 18 to force the switch closed.

Although the present invention has been described with respect to a particular embodiment thereof, it is not to be so limited as changes may be made therein within the scope of the invention as defined by the appended claims.

I claim:

1. An aircraft guidance control signal development system comprising a source of radio deviation signals indicative of aircraft displacement from a selected radio-defined course, means for developing a heading error signal proportional to the difference between the magnetic heading of said aircraft and said selected radio-defined course, signal mixing means receiving said radio deviation signal and said heading error signal, crosswind compensation means receiving said heading error signal, said crosswind compensating including signal integrating and inverting means, the output from said crosswind compensating means being connectible to said mixing means, said mixing means developing from the inputs thereto a composite command signal, first switching means signal sensing means comprising a threshold sensitive amplifier receiving said radio deviation signal and said composite command signal and being adapted in response to input signals thereto beneath a predetermined magnitude to deactivate said first switching means, timing means including second switching means, control means for said timing means connected to and operative in response to said first switching means being deactivated to deactivate said second switching means a predetermined time thereafter, said second switching means being operably connected to the output from said crosswind compensating means to effect connection between said crosswind compensating means and said mixing means upon being deactivated.

2. An aircraft guidance control signal development system as defined in claim 1 wherein said timing means comprises a reversible motor, a motor energizing source for said motor being connectible thereto through said first switching means, said control means comprising means for rotating said motor to a first rotational limit in response to said first switching means being activated and to a second opposite rotational limit upon said first switching means being deactivated, a system function relay including a control winding and a first set of contacts, said first set of contacts providing a holding contact when closed by connection of said relay winding through said first switching means to an energizing source upon said first switching means being deactivated, a first timer motor activated switch being opened at the first rotational limit of said motor and being connected between said relay holding contact and a source of energizing voltage, a second timer motor activated switch being closed at the second opposite rotational limit of said motor and being connected between said relay winding and a source of energizing voltage, means connecting a momentary activating voltage to said relay winding upon initial activation of said system whereby initial deactivation of said first switching means initiates timer motor rotation between said rotational limits and said system function relay is held energized thereafter for the time of rotation of said motor between said limits regardless of subsequent states of activation of said first switching means during the time required for rotation of said motor between said limits, and said second switching means comprising further contacts of said system function relay.

3. An aircraft guidance control signal development system comprising a source of radio deviation signals indicative of aircraft displacement from a selected radio-defined course, means for developing a heading error signal proportional to the difference between the magnetic heading of said aircraft and said selected radio-defined course, signal mixing means receiving said heading error signal and said radio deviation signal and developing therefrom a composite command signal corresponding to the algebraic difference between the inputs thereto, crosswind compensating means receiving said heading error signal, the output from said crosswind compensating means being connectible to said mixing means, signal translating means connected to the output of said mixing means and including first and second signal limiting means through which the output from said mixing means is selectively translatable, the outputs from said first and second signal limiting means comprising a composite aircraft control signal, first switching means, signal sensing means comprising a threshold sensitive amplifier receiving said radio deviation signal and said composite aircraft control signal and being adapted to deactivate said first switching means in response to either of the input signals to said sensing means being less than a predetermined magnitude, timing means, second switching means, control means for said timing means connected to and operative in response to said first switching means being deactivated to deactivate said second switching means a predetermined time following the deactivation of said first switching means, said second switching means being operably connected between said crosswind compensation means and said mixing means and between said mixing means and said signal limiting means, and being adapted upon being deactivated to effect engagement between said crosswind compensating means and said mixing means and to effect connection between the output of said mixing means and a preselected one of said first and second signal limiting means the limit of which is less than that defining the threshold of said signal sensing means.

4. An aircraft guidance control signal development system as defined in claim 3 wherein said timing means comprises a reversible motor, a motor energizing source for said motor being connectible thereto through said first switching means, said control means comprising means for rotating said motor to a first rotational limit in response to said first switching means being activated and to a second opposite rotational limit upon said first switching means being deactivated, a system function relay including a control winding and a first set of contacts, said first set of contacts providing a holding contact when closed by connection of said relay winding through said first switching means to an energizing source upon said first switching means being deactivated, a first timer motor activated switch being opened in the first rotational limit of said motor and being connected between said relay holding contact and a source of energizing voltage, a second timer motor activated switch being closed at the second opposite rotational limit of said motor and being connected between said relay winding and a source of energizing voltage, means connecting a momentary activating voltage to said relay winding upon initial activation of said system whereby initial deactivation of said first switching means initiates timer motor rotation between said rotational limits and said system function relay is held energized thereafter for the time of rotation of said motor between said limits regardless of subsequent states of activation of said first switching means during the time required for rotation of said motor between said limits, and said second switching means comprising further contacts of said system function relay.

5. A signal development system as defined in claim 3 wherein said timing means comprises a reversible motor, said control means being adapted to effect operation of said motor toward first and second opposite rotational limits in response to said first switching means being activated and deactivated respectively, said second switching means comprising a relay including a holding contact, the winding of said relay selectively connected to an energizing voltage source through said holding contact and said first switching means when said first switching means is deactivated, third switching means, the winding of said relay being further selectively connected to an energizing voltage source through said holding contact and said third switching means, fourth switching means, the winding of said relay additionally selectively connected through said fourth switching means to an energizing source, each of said third and fourth switching means being operably connected to said motor for positioning in response to said motor rotational limits, said third switching means being opened only when said motor is positioned in said first predetermined rotational limit and said fourth switching means being closed only when said motor is positioned to the second opposite rotational limit.

6. A signal developing means as defined in claim 3 wherein said timing means comprises a reversible motor, said second switching means comprising a relay including a latching contact, means to effect momentary energization of said relay upon initial energization of said system, a first locking path for said relay comprising means whereby the winding thereof is connected through the closed latching contact of said relay to a source of energizing voltage through said first switching means upon said first switching means being deactivated, a second locking path for said relay comprising a first limit switch connected to said timing motor and adapted to be opened only at a first rotational limit of said timing motor and upon being closed effecting connection between said relay latching contact and a source of energizing voltage, a third energy path for said relay winding comprising a second limit switch connected to said timing motor and adapted to be closed only at a second opposite rotational limit of said timing motor, said second limit switch when closed effecting connection between said relay winding and a source of energizing voltage, whereby said relay upon being initially energized is held energized for a predetermined time after deactivation of said first switching means, said time being defined by the rotation of said timing motor between said second and first rotational limits.

7. A signal development means as defined in claim 4, including a fifth switch connected between said first switching means and said source of energizing voltage and effecting in a predetermined position thereof a connection therebetween, a sixth switch connected between said third switch and said source of energizing voltage whereby connection therebetween may be selectively effected, said sixth switch when open thereby rendering ineffective the predetermined delay in de-activation of said second switching means after deactivation of said first switching means.

8. Signal development means as defined in claim 3 wherein said crosswind compensating means includes capacitive means for integrating said heading error signal, said second switching means further including means when activated to remove the charge on said capacitive means.

9. A signal development system as defined in claim 3, further comprising a second signal sensing means connected between said source of radio deviation signals and said mixing means and being adapted to effect disconnection between said radio deviation signals and said mixing means upon said radio deviation signals exceeding a further predetermined magnitude and upon said radio deviation signals exceeding a predetermined rate of change of magnitude.

10. An aircraft guidance control signal system comprising means for developing a first deviation signal proportional to the displacement of an aircraft from a radio defined course, means for developing a second deviation signal proportional to the difference between the heading of said aircraft and a selected radio defined course, signal mixing means receiving said first and second deviation signals and developing therefrom an output signal corresponding to the algebraic difference between said first and second deviation signals, signal threshold sensing means receiving said first deviation signal and the output signal from said mixing means, first switching means operably connected to said sensing means, said sensing means being adapted in response to the input thereto exceeding a predetermined threshold to operate said first switching means from a first to a second position, second switching means, crosswind compensating means receiving said second deviation signal and being connected to said second switching means whereby said compensating means may be selectively activated and connected to said mixing means by said second switching means in a first position thereof, and time delay means operably connected between said first and second switching means, said delay means being adapted to effect operation of said second switching means between the second and first positions thereof in response to and a predetermined time after the operation of said first switching means between its first and second positions.

11. An aircraft guidance control signal system as defined in claim 10 further comprising first and second signal limiting means, the output from said mixing means being selectively connectible through one of said limiting means to said sensing means through said second switching means in a first position of said second switching means, each of said limiting means establishing an amplitude limit for input signals applied therethrough, the limit of said first limiting means being less than the amplitude threshold to which said sensing means is responsive to switch said first switching means from the first to the second position thereof.

No references cited.